United States Patent Office

3,450,563
Patented June 17, 1969

3,450,563
NON-SKID FINISH
Robert C. Krueger, Whitefish Bay, Wis., assignor to PPG Industries, Inc., Pittsburgh, Pa., a corporation of Pennsylvania
No Drawing. Filed Aug. 19, 1965, Ser. No. 481,111
Int. Cl. C08f 37/18; C09k 3/14
U.S. Cl. 117—161                     8 Claims

ABSTRACT OF THE DISCLOSURE

Liquid coating compositions which cure to a protective non-skid surface contain an aldehyde-modified and etherified interpolymer of an ethylenically unsaturated carboxylic acid amide and one or more other copolymerizable monomers and solid particulate polypropylene. The coatings obtained are abrasive in texture yet tough, durable and attractive in appearance.

---

Areas which are apt to become wet during use, such as boat decks, swimming pool copings and ladders, etc., require for safety a surface which does not become excessively slippery when wet. Such a non-skid surface should be relatively rough or abrasive, with minute projections or the like to prevent formation of a continuous film of water on the surface. Surfaces of this type can be obtained by coating a wet paint or adhesive with sand or other abrasive or particulate material, but because the areas in question are also subject to intensive wear and weathering, surfaces prepared in such a manner are generally not satisfactory because the non-skid quality is soon lost. In addition, such finishes do not have attractive appearance such as is desirable in articles comprising surfaces of this nature.

It has now been found that durable non-skid surfaces are provided by coating the surface with a composition comprising a mixture of an aldehyde-modified unsaturated amide interpolymer, as hereinafter described, and solid, particulate polypropylene, and curing the coated surface at elevated temperature. The finish thus obtained is tough, attractive in appearance and abrasive in texture, and yet is resistant to wear to a surprising degree.

Various aldehyde-modified amide interpolymers of the class employed herein are described in several United States patents, including U.S. Patents Nos. 2,870,117, 2,978,437, and 3,037,963. These modified interpolymers are prepared by interpolymerizing a polymerizable unsaturated carboxylic acid amide with one or more ethylenically unsaturated monomers, followed by reaction of the resulting interpolymer with an aldehyde and an alcohol.

The interpolymer reacts with an aldehyde, such as formaldehyde, to replace amido hydrogen atoms with a methylol or other alkylol group. While it is believed that generally one hydrogen atom per amido group is replaced, it is possible to replace both, and such di-substituted amido groups are likely obtained in some proportion. Further reaction of the alkylol group with an alcohol results in etherification, so that the interpolymer then has amido hydrogen atoms replaced by groups of the structure:

wherein R is hydrogen or a lower alkyl radical, depending upon the aldehyde employed, and $R_1$ is the radical derived by removing a hydroxyl group from the alcohol. $R_1$ is most often lower alkyl, from a lower alkanol, or alkoxyalkyl, from an ethylene glycol monoalkyl ether, e.g., butyl Cellosolve or butyl Carbitol.

At least some of the alkylol groups should be etherified, e.g., at least about 5 percent, and it is desirable that at least about 50 percent of these groups be etherified since compositions having less than about 50 percent of the alkylol groups etherified tend to be unstable and subject to gelation. Butanol is the preferred alcohol for use in the etherification process, although any monohydric alcohol, such as methanol, ethanol, propanol, pentanol, octanol, decanol, and other alkanols containing up to about 20 carbon atoms, may also be employed, as may aromatic alcohols, such as benzyl alcohol; or cyclic alcohols, such as the Cellosolves (ethylene glycol monobutyl ether and similar ethylene glycol monoalkylene ethers) and the Carbitols (diethylene glycol monoalkyl ethers, e.g., butyl or ethyl ethers).

Acrylamide or methacrylamide is preferred for use in forming the interpolymer component, but any unsaturated carboxylic acid amide can be employed. Such other amides include itaconic acid diamide, alpha-ethyl acrylamide, crotonamide, fumaric acid diamide, maleic acid diamide, and other amides of alpha-beta-ethylenically unsaturated carboxylic acids containing up to about 10 carbon atoms. Maleuric acid and esters thereof, and imide derivatives, such as N-carbamyl maleimide, may also be utilized.

At least one other unsaturated monomer is interpolymerized with the unsaturated carboxylic acid amide; any polymerizable ethylenically unsaturated monomer can be so utilized. Such monomers include monoolefinic and diolefinic hydrocarbons, unsaturated esters of organic and inorganic acids, esters of unsaturated acids, nitriles, unsaturated acids, and the like. The interpolymer compositions described in U.S. Patent No. 3,037,963 are excellent examples of the preferred type of amide polymers utilized in the instant invention, and the compounds disclosed therein illustrate the numerous monomers which can be interpolymerized along with the amide. Specific comonomers typically utilized include vinyl aromatic monomers, such as styrene and vinyl toluene; vinyl halides, such as vinyl chloride; polyhaloethylenes, such as vinylidene chloride; vinyl esters, such as vinyl acetate and vinyl butyrate; methyl methacrylate, ethyl acrylate, and other alkyl acrylates and methacrylates having 1 to 20 carbon atoms in the alkyl group; hydroxyalkyl esters, such as hydroxyethyl acrylate, hydroxyethyl methacrylate, and hydroxypropyl methacrylate; halogenated esters, such as methyl alpha-chloroacrylate; unsaturated dicarboxylic acid esters, such as dimethyl maleate, dibutyl maleate, and diethyl fumarate; organic nitriles, such as acrylonitrile and methacrylonitrile; and acid monomers, such as acrylic acid, methacrylic acid, itaconic acid, maleic acid, fumaric acid, butyl hydrogen maleate, methyl hydrogen fumarate, and other monoesters of maleic, fumaric, and similar acids.

The preferred interpolymers for the present invention contain from 5 percent to 25 percent of acrylamide; generally, they contain at least about 20 percent of a vinyl aromatic monomer, preferably styrene, vinyl toluene or alpha-methyl styrene, or a minor proportion, e.g., 10 percent to 50 percent, of one or more lower alkyl esters of acrylic or methacrylic acid, such as ethyl acrylate or methyl methacrylate. A small proportion, e.g., 1 percent to 10 percent, of an acid monomer, preferably an acrylic acid, i.e., acrylic acid, methacrylic acid, or other substituted acrylic acid, is also often included. These interpolymers when employed in the compositions herein provide the best combination of properties from the standpoint of durability, weather resistance, compatibility, and cost.

In carrying out the polymerization reaction, there may be employed a peroxygen type catalyst, such as benzoyl peroxide and cumene hydroperoxide. Peroxycarbonates, such as tertiary-butylperoxy isopropyl carbonate, are also effective catalysts, especially in difficult to control polymerizations. Azo compounds, such as p-methoxyphenyl diazo-thio(2-naphthyl)ether and alpha,alpha'-azobis(isobutyronitrile), may also be used, as can mixtures of catalysts and redox catalyst systems. The quantity of catalyst employed can be varied considerably; however, in most instances it is desirable to utilize from about 0.1 percent to 2.0 percent by weight, based on monomers.

To obtain relatively low molecular weight interpolymers, the use of a lower alkanol, such as butanol or a mixture of butanol and water as the solvent, together with high catalyst levels, aids considerably, but if desired there may be added controlled amounts of chain-modifying materials. Mercaptans, such as tertiary-dodecyl mercaptan, are ordinarily used for this purpose.

The polymerization is best carried out by admixing the amide and the other monomer or monomers with the catalyst and chain-modifying agent, if any, in the solvent, and refluxing the resulting solution for a time sufficient to obtain the desired conversion. Ordinarily, the polymerization will be complete in about 1 to 16 hours. It may in some instances be desirable to add only a portion of the catalyst initially, the remainder being added in increments as the polymerization progresses.

As indicated above, the amide interpolymer resin is further reacted with an aldehyde, preferably in the presence of an alcohol. Formaldehyde, in solution in water (Formalin) or in an alkanol, such as butanol, or a formaldehyde-yielding substance, such as paraformaldehyde, trioxymethylene, or hexamethylenetetramine, is greatly preferred. However, other aldehydes, such as acetaldehyde and butyraldehyde, can be used. The reaction is preferably carried out in the presence of a mild acid catalyst, such as maleic anhydride. The water of condensation can be removed by azeotropic distillation, as may a portion of the solvent if desired.

Similar modified interpolymers may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers. The interpolymer can then be reacted with an alcohol to effect etherification. Also, the modified interpolymer can be obtained by interpolymerizing an N-alkoxyalkyl amide, for example, N-butoxymethyl acrylamide, with one or more $CH_2$=C< monomers, as described in U.S. Patent No. 3,079,434. In still another method, all of the reactants, including the aldehyde and alcohol, can be admixed and the polymerization, alkylolation and etherification reactions carried out together.

Polypropylene is blended with the aforesaid amide interpolymers in compositions which are cured to provide the coatings of the invention. The polypropylene utilized is solid and particulate in form, such polypropylene being known in the art and commercially available, and is ordinarily produced by polymerization of propylene to a relatively high molecular weight in the presence of a transition metal catalyst. The polypropylene provides the anti-skid quality by remaining as nubs or projections in the finished coating, even after the coating is cured at high temperatures.

The particle size of the polypropylene employed is important to provide finishes of the desired degree of abrasiveness and yet sufficiently resistant to wear to provide this property for an extended period of time during use. It has been found that satisfactory results are attained using polypropylene in which a major proportion of the particles have a maximum dimension between about 0.1 and about 1 millimeter; generally, in the products made as described herein, substantially all of the polypropylene is of such a size.

It is also desirable to include in the composition a minor proportion, e.g., 2 percent to 20 percent by weight based on the total composition, of a polymer of an aliphatic unsaturated alcohol or an adduct of a hydroxyl-containing polymer and a carboxylic acid anhydride. Polymers of aliphatic unsaturated alcohols as employed herein are described in U.S. Patent No. 3,118,852; among the preferred polymers in this class are styrene-allyl alcohol copolymers containing from about 4 to 10 hydroxyl groups per molecule. Compositions including adducts of a hydroxyl-containing polymer and a carboxylic acid anhydride are described in U.S. Patent No. 3,118,853. The preferred adducts are made from maleic anhydride and polymers, such as the copolymers of styrene and allyl alcohol mentioned above. The use of a hydroxyl-containing polymer or adduct of such a polymer and a dicarboxylic acid anhydride, while not always necessary, aids in imparting certain film properties in the coating, such as hardness, weather resistance and the like, while yet permitting curing of the coating at temperatures that can be more easily attained in commercial installations.

Ordinarily, the compositions herein also contain pigments to provide finishes of various colors, although clear compositions can be employed if so desired. Various pigments can be utilized with these materials, including inert pigments, organic color pigments, inorganic pigments and others. Similarly, other materials can be added to provide particular properties in the formulated compositions, these including various resinous materials, such as epoxy resins, plasticizing materials, anti-skinning agents, anti-flooding agents, defoamers, bactericides and the like.

It has been found that best results are obtained when the polypropylene is present in an amount between about 0.2 and about 1 pound per gallon of the coating composition, although other proportions can be utilized for particular uses. It is best to define the amount of polypropylene in terms of the finished composition because it is the concentration in the finished composition which determines the utility and non-skid quality of the coating provided.

The procedure by which these compositions are obtained comprises the preparation and formulation of the coating composition in conventional manner, followed by the incorporation of the polypropylene into the composition by blending so as to achieve a relatively homogeneous mixture. The composition thus obtained can be easily applied by conventional techniques, including brushing and the like. Moreover, this composition can also be applied by spraying and the presence of the polypropylene does not adversely affect the spraying characteristics or the spray equipment. The composition is stable during storage and it has been found that the polypropylene has little or no tendency to settle and cake during even relatively long storage.

After application, the coatings are cured at elevated temperatures, usually between about 250° F. and 450° F. As noted, the anti-skid characteristics of the coatings are provided despite curing at such temperatures.

Examples of the amide interpolymers which can be employed in the invention are as follows:

INTERPOLYMER A

The following are charged into a reaction vessel:

| | Parts by weight |
|---|---|
| Acrylamide | 30.0 |
| Methacrylic acid | 7.5 |
| Styrene | 130.5 |
| Ethyl acrylate | 132.0 |
| Cumene hydroperoxide | 3.0 |
| Tertiary dodecyl mercaptan | 3.75 |
| Butanol | 75.0 |
| Xylene | 75.0 |

This mixture is refluxed for 2 hours and then 1.5 parts of cumene hydroperoxide are added. After refluxing for another 2 hours, there are added 63.6 parts of a 40 percent solution of formaldehyde in butanol, 0.8 part of maleic anhydride, 1.5 parts of cumene hydroperoxide, and 50 parts of toluene. This mixture is azeotropically distilled for 2 hours to remove the water of reaction, 1.5 parts of cumene hydroperoxide are added, the mixture is refluxed for 2 hours, and then an additional 1.5 parts of cumene hydroperoxide are added. After refluxing for 2 more hours, the resulting solution is cooled and 100 parts of toluene are added, whereupon the resulting composition has a solids content of about 50 percent and Gardner-Holdt viscosity of U to W.

INTERPOLYMER B

The following are charged into a reaction vessel:

| | Parts by weight |
|---|---|
| Acrylamide | 10 |
| Ethyl acrylate | 65 |
| Styrene | 25 |
| n-Butanol | 50 |
| Aromatic hydrocarbon solvent (boiling range 185° C.–200° C.) | 50 |

The above soution is refluxed for 2 hours in the presence of 1 part of cumene hydroperoxide with 0.5 part additional cumene hydroperoxide being added after each of three successive refluxing periods of 2 hours each. After the fourth 2-hour reflux period, 0.5 part of cumene hydroperoxide, 21 parts of a 40 percent solution of formaldehyde in butanol, and 0.3 part of maleic anhydride are added to the mixture, which is then azeotropically distilled for 3 hours to remove the formed water. After filtering and cooling to 125° F., 6.6 parts of a 75 percent toluene of polyepoxide are added (diglycidyl ether of Bisphenol A, epoxide equivalent 425 to 525). The solids content of the product is about 50 percent and it has a Gardner-Holdt viscosity of T to X.

INTERPOLYMER C

The following are charged into a reaction vessel:

| | Parts by weight |
|---|---|
| Acrylamide | 90 |
| Methacrylic acid | 15 |
| Ethyl acrylate | 264 |
| Styrene | 231 |
| n-Butanol | 300 |
| Toluene | 300 |

This mixture is refluxed for 2 hours in the presence of 9 parts of tertiary dodecyl mercaptan and 9 parts of cumene hydroperoxide. An additional 3 parts of cumene hydroperoxide are then added and the mixture refluxed for another 2 hours, after which there are added 3 more parts of cumene hydroperoxide, 190.5 parts of a 40 percent solution of formaldehyde in butanol and 2.6 parts of maleic anhydride. After this mixture is azeotropically distilled for 2 hours, 3 more parts of cumene hydroperoxide are added and azeotropic distillation is contained for 2 more hours. After filtering, the product has a solids content of 50 percent and a Gardner-Holdt viscosity of U to W.

Several pigment compositions which are advantageously utilized in making pigmented compositions in accordance with the invention are as follows:

PIGMENT COMPOSITION D

A mixture of 300 parts of interpolymer A, 75 parts of 2-nitropropane, and 15 parts of xylene is thoroughly blended with 1000 parts of titanium dioxide. This paste is then reduced with 100 parts of xylene and 75 parts of Cellosolve acetate to give a white pigment composition that can be used to pigment compositions made from the foregoing interpolymers and others of this class.

PIGMENT COMPOSITION E

A black pigment composition is produced by blending 180 parts of interpolymer A, 75 parts of 2-nitropropane, 40 parts of Cellosolve acetate, 130 parts of xylene, and 115 parts of lamp black. This paste is then reduced with a total of 235 parts of interpolymer A and 65 parts of xylene to provide the black pigment composition.

PIGMENT COMPOSITION F

A yellow pigment composition is produced by grinding together 140 parts of interpolymer A, 665 parts of yellow iron oxide, 85 parts of 2-nitropropane, 80 parts of xylene, and 30 parts of Cellosolve acetate. The mixture is reduced with 175 parts of interpolymer A, 95 parts of xylene, and 35 parts of Cellosolve acetate.

PIGMENT COMPOSITION G

A pigment composition useful for providing flat finishes is produced by blending together 297 parts of interpolymer B, 200 parts of aromatic naphtha solvent (boiling point 150° C. to 170° C.) and 5 parts of a dispersion of 2 parts of bentonite in 1 part of ethanol. To this mixture there are added 223 parts of finely-divided silica gel pigment having a particle size of about 9 to 11 microns. The pigment dispersion is reduced with 168 parts of the above aromatic solvent to provide the finished pigment composition.

Several examples of the compositions of the invention using the above interpolymers and pigment compositions are given below. These examples are intended to illustrate the invention and are not to be construed as limiting it to their details. All parts and percentages are by weight unless otherwise specified.

EXAMPLE 1

The following were thoroughly blended:

| | Parts by weight |
|---|---|
| Interpolymer A | 247 |
| Adduct of maleic anhydride and styrene-allyl alcohol copolymer[1] | 60 |
| Epoxy resin[2] solution (65 percent solids in toluene) | 20 |
| Xylene | 40 |
| Diacetone alcohol | 15 |
| Butyl Carbitol | 15 |
| Anti-flooding agent (2 percent solution of XF–1023 silicone fluid in xylene) | 2 |

[1] Made according to Example VIII of U.S. Patent No. 3,118,853.
[2] Diglycidyl ether of Bisphenol A, epoxide equivalent 690–810.

There were then added 30 parts of a dispersion of 50 parts of interpolymer A in 50 parts of a 20 percent xylene solution of polyethylene wax (molecular weight about 2000, acid number 14–17). This mixture was pigmented by blending with 140 parts of pigment composition D, 250 parts of pigment composition G, 2 parts of pigment composition E, 15 parts of phthalocyanine blue paste, and 7 parts of phthalocyanine green paste. The composition thus obtained was homogeneously mixed with 40 parts of solid polypropylene particles (20–150 mesh). The finished composition had a viscosity of 65–70 seconds at 77° F. (#4 Ford cup). When sprayed on aluminum and cured for 8 minutes at 385° F. to give a 1.0 to 1.2 mil coating, it provided a hard, tough finish having excellent non-skid characteristics and durability.

EXAMPLE 2

The following were blended:

| | Parts by weight |
|---|---|
| Interpolymer A | 12 |
| Titanium dioxide | 14 |
| Polyethylene solution[1] | 30 |
| Phthalocyanine blue | 30 |
| Phthalocyanine green | 5 |
| Pigment composition F | 20 |

[1] As in Example 1.

This mixture was added to a blend of:

| | Parts by weight |
|---|---|
| Interpolyer A | 265 |
| Anti-flood agent[1] | 2 |
| Butyl Carbitol | 15 |
| Diacetone alcohol | 15 |
| Xylene | 72 |
| Adduct of maleic anhydride[1] | 60 |
| Pigment composition G | 250 |

[1] As in Example 1.

The above composition and 40 parts of polypropylene particles (as in Example 1) were thoroughly mixed to obtain a coating composition which when coated and cured as above provids an excellent non-skid finish.

Other examples of the invention are produced by substituting other interpolymers, such as interpolymer C above and those described in the above-mentioned patents, for the interpolymer component in Examples 1 and 2. Similarly, other additive materials in addition to those mentioned can be employed, or compositions suitable for many purposes can be produced by simply blending the interpolymer and the polypropylene without the addition of other materials. Also, other proportions of polypropylene can be employed to give the desired density of anti-skid nubs desired. Such factors as film thickness (which can be varied considerably) and the pattern of abrasive nubs desired are considered in determining the amount and size of polypropylene utilized.

According to the provisions of the patent statutes, there are described above the invention and what are now considered to be its best embodiments. However, within the scope of the appended claims, it is to be understood that the invention can be practiced otherwise than has been specifically described.

I claim:

1. An article comprising a surface having thereon a non-skid coating containing nubs of particulate polypropylene; said coating being a cured layer of a coating composition comprising a mixture of
   (1) an interpolymer containing from about 5 percent to about 25 percent of an ethylenecially unsaturated carboxylic acid amide and at least one other monomer having a copolymerizable terminal ethylenic group, said interpolymer being characterized by having an amido hydrogen atom replaced by the structure:

where R is selected from the group consisting of hydrogen and lower alkyl radicals and $R_1$ is a radical derived by removing the hydroxyl group from a monohydric alcohol, and
   (2) solid, particulate polypropylene in which the major proportion of the particles have a dimension between about 0.1 and about 1 millimeter, said polypropylene being present in an amount between about 0.2 and about 1 pound per gallon of said coating composition.

2. The article of claim 1 in which said composition containing as an added component a member of the group consisting of (a) a polymer of an aliphatic unsaturated alcohol and (b) an ungelled adduct of a polymer containing free hydroxyl groups and an anhydride of a dicarboxylic acid.

3. The article of claim 1 in which said interpolymer contains acrylamide as the unsaturated amide and is characterized by having amido hydrogen atoms replaced by the structure $-CH_2OR_1$, where $R_1$ is lower alkyl.

4. The article of claim 3 in which at least about 50 percent of the amido groups have a hydrogen atom replaced by said structure.

5. The article of claim 3 in which $R_1$ is butyl.

6. A method of producing an anti-skid coating containing nubs of particulate polypropylene, said method comprising the steps of
   (A) applying to the surface of a substrate a layer of a liquid coating composition comprising a mixture of
      (1) an interpolymer containing from about 5 percent to about 25 percent of an ethylenically unsaturated carboxylic acid amide and at least one other monomer having a copolymerizable terminal ethylenic group, said interpolymer being characterized by having an amido hydrogen atom replaced by the structure:

where R is selected from the group consisting of hydrogen and lower alkyl radicals and $R_1$ is a radical derived by removing the hydroxyl group from a monohydric alcohol, and
      (2) solid, particulate polypropylene in which the major proportion of the particles have a dimension between about 0.1 and about 1 millimeter, said polypropylene being present in an amount between about 0.2 and about 1 pound per gallon of said coating composition; and
   (B) curing said layer by heating to a temperature between about 250° F. and about 450° F.

7. The method of claim 6 in which said composition contains as an added component a member of the group consisting of (a) a polymer of an aliphatic unsaturated alcohol and (b) an ungelled adduct of a polymer containing free hydroxyl groups and an anhydride of a dicarboxylic acid.

8. The method of claim 6 in which said interpolymer contains acrylamide as the unsaturated amide and is characterized by having at least about 50 percent of the amido groups with a hydrogen replaced by the structure

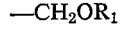

where $R_1$ is lower alkyl.

References Cited

UNITED STATES PATENTS

| 3,011,993 | 12/1961 | Kapalko et al. | 260—854 |
| 3,044,899 | 7/1962 | Canterino | 260—897 |
| 3,118,853 | 1/1964 | Hart et al. | 260—897 |
| 3,283,036 | 11/1966 | Larson | 260—854 |

SAMUEL H. BLECH, *Primary Examiner.*

JOHN C. BLEUTGE, *Assistant Examiner.*

U.S. Cl. X.R.

117—132; 260—33.6, 39, 837, 854, 897